United States Patent [19]
Jones et al.

[11] Patent Number: 6,042,727
[45] Date of Patent: Mar. 28, 2000

[54] POROUS AMORPHOUS SILICA-ALUMINA REFRACTORY OXIDES, THEIR PREPARATION AND USE AS SEPARATION MEMBRANES

[75] Inventors: Stephen David Jones, Ashby-De-Zouch; Timothy Neil Pritchard, Loughborough, both of United Kingdom

[73] Assignee: British Gas plc, London, United Kingdom

[21] Appl. No.: 09/139,733

[22] Filed: Aug. 25, 1998

Related U.S. Application Data

[62] Continuation of application No. 08/896,421, Jul. 18, 1997, which is a continuation of application No. 08/387,812, filed as application No. PCT/GB93/01151, Jun. 1, 1993, abandoned.

[30] Foreign Application Priority Data

Jun. 2, 1992 [GB] United Kingdom ............... 9211617

[51] Int. Cl.$^7$ .................................. B01D 39/00
[52] U.S. Cl. ........................ 210/500.21; 210/500.25; 210/500.26; 501/80; 502/235; 502/407; 423/327.1; 423/328.2
[58] Field of Search ................. 423/327.1, 328.1; 501/12, 80; 210/500.21, 500.25, 500.26; 502/407, 235

[56] References Cited

U.S. PATENT DOCUMENTS

| | | | |
|---|---|---|---|
| 4,619,908 | 10/1986 | Cheng et al. | 502/331 |
| 4,981,590 | 1/1991 | Van 'T Veen et al. | 210/500.25 |
| 5,194,200 | 3/1993 | Anderson | 204/65 |
| 5,250,096 | 10/1993 | Bruce et al. | 501/12 |
| 5,268,101 | 12/1993 | Anderson et al. | 501/12 |
| 5,434,118 | 7/1995 | Carati et al. | 502/235 |
| 5,439,624 | 8/1995 | Anderson et al. | 264/60 |
| 5,500,199 | 3/1996 | Bellussi et al. | 423/328.2 |
| 5,610,109 | 3/1997 | Anderson et al. | 501/80 |
| 5,639,412 | 6/1997 | Anderson et al. | 252/31.32 |
| 5,731,261 | 3/1998 | Balducci et al. | 501/178 |

FOREIGN PATENT DOCUMENTS

| | | |
|---|---|---|
| 0264268 | 4/1988 | European Pat. Off. |
| 0407181 | 1/1991 | European Pat. Off. |
| 10157792 | 1/1966 | United Kingdom |
| 1285502 | 8/1972 | United Kingdom |
| 2176128 | 12/1988 | United Kingdom |

OTHER PUBLICATIONS

Database WPI Week 8951 Derwent Publications Ltd London GB & JP,A, 1 281 106 (A. Ishikawa) See Abstract.
Japanese Laid open application 57–123841.
NASA Technical Memorandum 89905 Sol–Gel Synthesis of MgO–SiO$_2$ Glass Compositions Having Stable Liquid–Liquid Immiscibility, Narottam P. Bansal.
Nihon Seramikkusu Kyokai Gakujutsu Ronbunshi Scientific Journal of the Ceramics Society of Japan, 97 [3] 224–228, 1989.
Chemical Abstracts, vol. 111, No. 4, Jul. 24, 1989, Columbus, Ohio, US; Abstract No. 27442t, T. Tsuchiya et al. p. 239; See Abstract & Nippon Seramikkusu Kyokai Gakujutsu Ronbunshi vol. 97, No. 3, 1989, Japan pp. 224–228.
Chemical Abstracts, vol. 98, No. 14, April 1983, Columbus, Ohio, US; Abstract No. 112463h, Nippon Sheet Glass Co p. 306 ; see abstract & JP,A,57 123 841 (ID.).
Journal of Non–Crystalline Solids vol. 82, No. 1/3, Jun. 1986, Amsterdam–NL pp. 117–182 A. Yasumori et al.
NTIS Tech Notes, 1990, Springfield, VA, US, p. 84 Lewis Research Center Making MgO/SiO$_2$ Glasses by the Sol Gel Process.

*Primary Examiner*—Gary P. Straub
*Attorney, Agent, or Firm*—Oblon, Spivak, McClelland, Maier & Neustadt, P.C.

[57] ABSTRACT

A process for preparing a porous amorphous silica-alumina refractory oxide is described in which a source of silica, such as tetra ethyl ortho silicate, in a non-aqueous solvent, such as an alcohol, is hydrolysed by adding an aqueous solution containing aluminum ions, in particular a solution of aluminum nitrate, thereby to form a sol and calcining the sol at, for example, 200° C. to 600° C. The product, which may have a microporous or mesoporous structure, is useful in the separation of fluids, especially the separation of carbon dioxide from natural gas.

12 Claims, No Drawings

POROUS AMORPHOUS SILICA-ALUMINA REFRACTORY OXIDES, THEIR PREPARATION AND USE AS SEPARATION MEMBRANES

This application is a Continuation of application Ser. No. 08/896,421, filed on Jul. 18, 1997, pending, which is a Continuation of Ser. No. 08/387,812 filed May 1, 1995, abandoned, which was filed as International Application No. PCT/GB93/01151 filed Jun. 1, 1993.

BACKGROUND TO THE INVENTION

This invention relates to a process for preparing a porous amorphous silica-alumina refractory oxide, particularly for preparing porous amorphous silica-alumina oxides of controlled pore size via the sol-gel route. These products are intended for use as separation membranes, particularly for the separation of polar fluids, such as carbon dioxide or water from less polar fluids such as methane.

There are a number of mechanisms by which fluid mixtures can be separated by a porous membrane. When the pores in the membrane are larger than the largest molecular diameter of the components in the fluid mixture by a factor of up to 5 times as large, separation can occur predominantly by differences in the absorptive interactions of the molecules to be separated with the surface of the membrane. For example, transport via surface diffusion relies on a high adsorption capacity for some gases compared to others. Pores of this size are referred to as micropores, and typically have diameters of about 3 to 20 Angstroms. Diffusion in the gas phase through pores having diameters approaching the mean free path dimensions of the molecules in the gas mixture is often termed Knudsen flow or Knudsen diffusion. Pores of this size are referred to as mesopores and typically have diameters of about 20 to 500 Angstroms (See Sing K. S. W. et al, Pure and Applied Chem., 57 pp 603 et seq, 1985). Knudsen and laminar flows would be the predominant transport mechanisms in pores of this diameter depending on the pressures and temperatures used to operate a membrane made with pores of these dimensions.

Membranes suitable for the separation of polar gases should, in principle, separate these gases predominantly via a surface diffusion method. For surface diffusion to predominate during transport of the gases through the membrane, three criteria should be fulfilled:

(i) Pore diameters must be of molecular dimensions:
(ii) The materials must be porous; and
(iii) A high adsorption capacity for polar gases compared to less polar gases should be manifest.

If pore diameters are larger than the micropore range, for example as in mesoporous materials, then flow through the membrane will have contributions from Knudsen diffusion and laminar flow. The latter is non-separative and the former, at best, separates on the basis of molecular velocities (as an approximation the ideal separation factor is calculated from the square root of the reciprocal of the molecular masses of the molecules). Wholly microporous membrane materials are therefore essential if the contribution to membrane transport from surface diffusion is to be optimised. Under this circumstance, separation of a polar gas from a less polar one, for example $CO_2$ from a mixture with $CH_4$, should be maximised. This is the reason for developing methods of making microporous oxides that have the properties listed above.

To deposit a membrane it is essential to have a stable colloid (sol) which contains the precursor of the oxide to be deposited. On heating, this precursor is converted to the oxide which forms the membrane. For a sol to be suitable for membrane manufacture is should preferably have a viscosity between 1 and 10 mPas. Viscosity of the sol is measured by using a Contraves Rheomat 30 viscometer, at a temperature of 23° C., at shear rates of 370, 684 and 1264 sec$^{-1}$. The average viscosity at these three shear rates is quoted. The sol must not flocculate or gel for several months, if at all. Gelling means a viscosity increase on storage. At room temperature, once the viscosity rises, gelling may occur within 7 days.

There is therefore a need to provide a process whereby a porous amorphous silica-alumina refractory oxide of desirable properties can be produced by the calcining of a stable sol of suitable viscosity.

We have now found that this objective can be achieved by the process of the present invention.

SUMMARY OF THE INVENTION

Thus, according to the present invention there is provided a process for preparing a porous amorphous silica-alumina refractory oxide comprising the steps of hydrolysing a source of silica in a non-aqueous solvent by adding thereto an aqueous solution containing aluminum ions, thereby to form a sol and calcining the sol.

For the sake of brevity, the aqueous solution containing aluminium ions is referred to herein as the "aluminium solution" and the source of silica in a non-aqueous solvent is referred to herein as the "silica solution".

The sol preferably has a viscosity of from 1 to 10 mPas. This viscosity makes the sol particularly suitable for the formation of a refractory oxide membrane by calcination of the sol in contact with a suitable porous support.

The sol is calcined at a temperature of from 200° C. to 600° C. At this temperature, free water is driven off, any organic matter such as the non-aqueous solvent is evaporated and a porous solid is formed containing silica. Aluminium-oxygen-silicon bonds are present which impart adsorption properties to the product. Depending on the ingredients used, and the amounts thereof, alumina is also present. The solid product may also contain other components derived from the ingredients of the sol, where such ingredients are not lost in the calcination process. Thus, for example, the presence of other metal cations in the sol would result in the presence of other metal oxides in the product.

In one embodiment of the invention, the product contains no such other components, or only a minor amount thereof. Thus, according to a preferred embodiment of the invention, the aluminium solution is a solution of aluminium nitrate, in particular a solution of $Al(NO_3)_3.9H_2O$. During the calcination step, any nitrate ions are decomposed and lost, probably in the form of nitrogen oxides, making nitrate a particularly suitable anion for the aluminium solution.

Again, according to a preferred embodiment of the invention, the source of silica is an alkyl silicate, or a mixture of alkyl silicates, such as according to the formula:

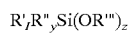

where R', R" and R'" are each independently a substituted or unsubstituted alkyl or aryl group, which may for example contain up to 20 carbon atoms, x+y+z=4, x is from 0 to 3, y is from 0 to 3 and z is from 1 to 4. Examples include tetra alkyl orthosilicates, for example tetra ethyl ortho silicate. The alkyl silicate is hydrolysed, wholly or partly, during sol preparation to form silanols, siloxane polymers and alcohols which are decomposed during calcination to silica and evaporated respectively. We are aware that the use of alkyl silicates to form silica gels is known, for example from: Campostrini et al, J Non Crystalline Solids, 108 pp 315–322, 1989; Ro J. C. et al, J Non Crystalline Solids, 110 pp 26–32, 1989; Brinker C. J., J Non Crystalline Solids, 100 pp 31–60, 1988; and Assink et al, Materials Research Symp Proc. 121 pp 25–35 1988.

We are also aware that processes have been described whereby mixed alkoxides of silicon and aluminium are used and hydrolysed together, or partially hydrolysing one alkoxide before adding the other. Examples of this are found in: Yoldas B. E., Ceram. Bull. 59 pp 429–483, 1980; Lopez T et al., J Non. Cryst. Solids 108 pp 45–48 1989; and Abe Y, J Non. Cryst. Solids 108 pp 150–156 1989. These methods however cannot produce stable sols and therefore membranes. The present invention on the other hand requires that the aluminium source is an aqueous solution containing aluminium ions and it is this feature which enables stable sols, and therefore membranes, to be produced. By introducing the aluminium in this way, silicon-oxygen-aluminium bonds are formed in the product which impart improved adsorption for polar gases to the membrane material.

According to a further preferred embodiment of the invention, the non-aqueous solvent is volatile, so as to leave no residue in the final product and for this reason we prefer that the non-aqueous solvent is a mono- or polyhydric alcohol, the nature of which depends on whether a microporous or a mesoporous product is desired, as explained in more detail below. Ideally, the non-aqueous solvent is miscible with water.

We have discovered that in order to obtain an ideal product, the characteristics of the sol are critical. Thus, according to a second aspect of the invention, there is provided a process for preparing a porous amorphous silica-alumina refractory oxide comprising the steps of calcining a sol containing a source of silica and a source of alumina, wherein the sol has a pH of from 1 to 4, preferably from 1 to 2, a viscosity of from 1 to 10 mPas and a stability against gelling, flocculation and precipitation of at least 10 days, preferably at least 180 days, and in that the sol is calcined at a temperature of from 200° C. to 600° C.

The stability against gelling, flocculation and precipitation is determined by storing the sol at a temperature of 20° C. under still conditions and visually observing whether gelation, flocculation and/or precipitation occurs.

Microporous Product

When a microporous product is desired, the relative proportions of the aluminium and silica solutions may be so chosen that the calcined product contains at least 80% by weight silica, calculated as $SiO_2$. This level of aluminium, calculated as $Al_2O_3$, is in this case not more than 20%, but is preferably at least 1%, most preferably at least 5%. The non-aqueous solvent may be selected from monohydric alcohols having from 1 to 4 carbon atoms and mixtures thereof, especially ethanol, propanol, butanol and mixtures thereof. The volume ratio of the source of silica to the non-aqueous solvent is preferably from 1:1 to 1:5, most preferably from 1:4 to 1:5. The concentration and relative proportions of the solutions are preferably so chosen that the sol contains less than 15 moles water per mole of silica. The hydrolysis is carried out at a pH of not more than 4, such as by the addition of an organic or inorganic monoprotic acid. Suitable such acids include nitric, hydrochloric, ethanoic and oxalic acids. In an alternative embodiment, no acid is added. This is appropriate when the solution container aluminium ions has a natural pH of not more than 4 and the hydrolysis is then carried out without the addition of acid.

Mesoporous Product

When a mesoporous product is required, the relative proportions of the aluminium and silica solutions may be so chosen that the calcined product contains not more than 80% by weight silica, calculated as $SiO_2$. The level of aluminium, calculated as $Al_2O_3$, is in this case not less than 20%, but is preferably less than 60%, most preferably less than 40%. When the level of aluminium is at least 50%, alumina as such occurs in the product. Below this proportion, the aluminium is present in the form of silicon-oxygen-aluminium structural units. For a mesoporous product, the non-aqueous solvent may be selected from polyhydric alcohols having more than 4 carbon atoms and their mixtures, such as ethanediol, propanediol and mixtures thereof. The volume ratio of the source of silica to the non-aqueous solvent is preferably no more than 1:1. The concentration and relative proportions of the solutions may be so chosen that the sole contains at least 15 moles water per mole of silica. In this embodiment, the hydrolysis is carried out at a pH of less than 4 or at a pH of at least 4, by the addition of an organic or inorganic base. The base may be selected from ammonia, ammonium salts and mixtures thereof, such bases not leaving any residue in the final product.

Supported Membranes

Usually, inorganic membranes made from refractory oxides are of micron thickness and are brittle. They therefore need mechanical support to give them the strength needed for practical use. This strength is usually provided via a ceramic substrate. The material and pore size of the substrate are important to membrane manufacture. Thus, when the product is used as a fluid separation membrane, the calcined porous amorphous silica-alumina refractory oxide is usually carried on a porous support, such as alumina, silica or an aluminosilicate, in particular, mullite. Ideally, the porous support has a pore size of from 0.1 to 5 $\mu$m, most preferably from 0.3 to 3 $\mu$m.

A slipcasting or dip-coating method may be used to prepare the membrane. In this method, the surface of the substrate covered by a material of pore size between 0.1 and 5.0 $\mu$m is contacted with the surface of the sol. Contact is maintained for preferably between 1 and 30, most preferably between 5 and 20 seconds. Immediately after slipcasting, the membrane and substrate are placed in an oven and heated. A typical heating regime is to heat to 95° C., hold for 3 hours, then heat to a temperature between 200° C. and 900° C., most preferably between 200° C. and 600° C., hold for 12 hours, and finally cool to ambient temperature. Heating and cooling rates of between 1 and 60° C./hr may be used, such as 10° C./hr.

This slipcasting method is repeated for successive cycles to build up the membrane layer. From 3 to 20 cycles may be appropriate, preferably from 8 to 15 cycles.

Surface treatment of the substrate and/or the membrane may be used to aid the deposition process or change the surface properties of the membrane. Thus, prior to contacting with the sol, the substrate is preferably contacted with an alcohol, such as methanol or ethanol. This not only restricts ingress of the sol into the pore structure of the substrate and produces thinner membrane films and hence higher gas permeabilities, but also prevents the rapid increase in concentration that would occur on contacting the sol with a dry substrate. This increase in concentration would increase reaction rates of the polymerisation process occurring in the sol and could alter the microstructural development of the membrane films in an undesirable manner.

After deposition of the membrane, the surface thereof may be treated with an alkyl silicate, such as tetraethyl orthosilicate or a solution thereof in a non-aqueous solvent as specified above. This further decreases the pore diameter of the membrane material. A similar procedure can also be applied to the bulk solid product.

A number of other ingredients may be incorporated into the membrane, for example by being included in the sol before calcining. Thus zeolite crystals may be incorporated. The presence of zeolite crystals has the advantage that the adsorption capacity of the membrane for polar adsorbates can be augmented and hence the selectivity of the membrane changed. Examples of useful ingredients in this respect include zeolites Y, X, 4A, mordenite and clinoptilolite.

It is also possible to include metal cations, especially cations of metals from Groups I and II of the Periodic Table, lanthanides and 1st and 2nd row transition metals, in the sols so as to incorporate them into the resulting oxide product. This can have several benefits including a change in the pore distribution, a change in the surface properties and/or may impart catalytic and redox properties.

To prepare the fluid separation membrane the sol is preferably calcined in the presence of the porous support, the relative amounts of sol and support being such that the weight ratio of the membrane to the support is between 0.001:1 and 0.1:1.

Separation of Fluids

According to a third aspect of the invention, there is provided a process for the separation of fluids, in which a mixture of fluids is brought into contact with a fluid separation membrane which comprises a calcined porous amorphous silica-alumina refractory oxide having a porosity of 10 to 70%, and a modal pore diameter of from 6 to 20 Angstroms.

The fluids which may be separated by this process may be liquids or gases, but we have found the process particularly suitable for the separation of polar gases, such as oxides from non-polar gases such as hydrocarbons. Thus according to a preferred embodiment of the invention the process is used to separate carbon dioxide and water vapour from methane.

The membranes according to the invention have ion-exchange properties. Thus, when such membranes are used for the separation of liquids containing excess metal ions, extraction of the metal therefrom may be achievable.

The invention will no be further illustrated by the following non-limiting examples. In these examples, all percentages are by weight unless otherwise stated.

In these examples, the parameters referred to are defined as follows:

"Pre Shape"

The definition of pore shape is taken from the IUPAC definition published in "Fundamentals of Adsorption" Proc. Eng. Found. Confr. Santa Barbara, Calif., 1986 by K. S. W. Sing pp 567–583. "I" and "IV" refer to the type of adsorption isotherm generated by adsorption of $N_2$ at 77K. This technique is called nitrogen physisorption. "H2" refers to the type of adsorption hysteresis shown by the sample during adsorption and desorption of $N_2$. $N_2$ physisorption also provides a measure of "pore volume".

"Modal Diameter"

is that diameter that which the largest fraction of the total volume in the pores is found.

"% Micropores"

is the fraction of the total volume in the pores that is found in pores whose diameter is less than 20 Angstroms.

"Porosity"

is the percentage of the total volume of the solid that is found in the pores. The volume in a porous solid is the sum of the volume occupied by the solid and that occupied by the pores. The volume occupied by the solid is measured by helium pycnometry. The volume in the pores is measured by physisorption.

EXAMPLES 1 TO 7

A sol was prepared as follows. 100 ml of tetra ethyl orthosilicate (TEOS) were mixed under continuous stirring at ambient temperature, with the same volume of ethanol. In a second vessel, 18.6 g of aluminium nitrate nonahydrate were dissolved in 8 ml of distilled water containing 2.8 ml of concentrated nitric acid. For hydrolysis, the aqueous solution was added under continuous stirring at ambient temperature to the ethanolic solution. The volume of water added provided a reaction mixture containing 2 moles of water per mole of orthosilicate ($H_2O$:Si=2).

To prepare the refractory oxide, 100 ml of the above reaction product was heated under the following regime: 10° C./hr to 95° C., hold for 3 hours, followed by 10° C./hr to 400° C., hold for 12 hrs.

The properties of the sol and of the final product were examined and found to be as follows (Example 1):

| Sol | |
|---|---|
| pH | 0.04 |
| Viscosity | 1.8 mPas |
| Gelation time | >32 days |
| Product | |
| % silica/alumina | 90/10 |
| Pore volume | 0.15 cm³/g |
| Modal pore diameter | 10 Angstroms |
| BET surface area | 219 m²/g |
| % porosity | 34 |
| % micropores | 13 |
| Pore shape | H2/IV |

When the amount of aluminium nitrate was increased from 18.6 g to 72.9 g, the properties of the sol and of the product were found to be as follows (Example 2):

| Sol | |
|---|---|
| pH | 0.04 |
| Viscosity | 2.9 mPas |
| Gelation time | >32 days |
| Product | |
| % silica/alumina | 70/30 |
| Pore volume | 0.06 cm³/g |
| Modal pore diameter | 11 Angstroms |
| BET surface area | 102 m²/g |
| % porosity | 13 |
| % micropores | 49 |
| Pore shape | H2/IV |

When the amount of water added was varied from 8 ml to 80 ml, the properties of the sol and of the final product were found to be as follows:

| Example No: | 1 | 3 | 4 | 5 | 6 | 7 |
|---|---|---|---|---|---|---|
| Sol | | | | | | |
| $H_2O:Si$ | 2 | 5 | 10 | 15 | 20 | 50 |
| pH | 0.4 | 1.1 | 1.4 | 0.88 | 1.3 | 1.3 |
| Viscosity (mPas) | 1.8 | 1.7 | 3.8 | 1.5 | 1.9 | 1.6 |
| Gelation time (days) | >32 | 35 | 11 | >32 | 55 | >43 |
| Product | | | | | | |
| % silica/alumina | | | | 90/10 | | |
| Pore volume ($c^3/g$) | 0.15 | 0.2 | 0.27 | 0.24 | 0.26 | 0.38 |
| Modal pore diameter (Angstroms) | 10 | 10 | 10 | 12 | 10 | 22 |
| BET surface area ($m^2/g$) | 219 | 312 | 456 | 512 | 469 | 700 |
| % porosity | 34 | 30 | 34 | 54 | 37 | 47 |
| % micropores | 73 | 66 | 61 | 74 | 54 | 35 |
| Pore shape | H2/IV | I | I | I | H2/IV | H2/IV |

EXAMPLES 8 TO 13

A sol was prepared as follows. 100 ml of TEOS were mixed under continuous stirring at ambient temperature, with the same volume of ethanol. In a second vessel, 18.6 g of aluminium nitrate nonahydrate were dissolved in 80.4 ml of distilled deionised water containing 2.8 ml of concentrated nitric acid. To produce the sol, the aqueous solution was added to the ethanolic solution under continuous stirring at ambient temperature. In this way, a sol containing 1 volume of alcohol per volume of TEOS was made.

To prepare the refractory oxide, 100 ml of the above sol was heated under the following regime: 10° C./hr to 95° C., hold for 3 hours, followed by 10° C./hr to 400° C., hold for 12 hrs.

The properties of the sol and of the final product were examined and found to be as follows (Example 8):

| Sol | |
|---|---|
| pH | 1.4 |
| Viscosity | 3.8 mPas |
| Gelation time | 12 days |
| Product | |
| % silica/alumina | 90/10 |
| Pore volume | 0.25 $cm^3/g$ |
| Modal pore diameter | 15 Angstroms |
| BET surface area | 381 $m^2/g$ |
| % porosity | 35 |
| % micropores | 61 |

When the ethanol of Example 8 was replaced by pentane diol, the properties of the sol and of the product were found to be as follows (Example 9):

| Sol | |
|---|---|
| pH | 1.2 |
| Viscosity | 2.2 mPas |
| Gelation time | 48 days |
| Product | |
| % silica/alumina | 90/10 |
| Pore volume | 0.99 $cm^3/g$ |
| Modal pore diameter | 63 Angstroms |
| BET surface area | 642 $m^2/g$ |
| % porosity | 68 |
| % micropores | 5 |

When the amount of aluminium nitrate was increased from 18.6 g to 72.9 g, the properties of the sol and of the final product were found to be as follows (Example 10):

| Sol | |
|---|---|
| pH | 0.9 |
| Viscosity | 16.3 mPas |
| Gelation time | 8 days |
| Product | |
| % silica/alumina | 70/30 |
| Pore volume | 0.13 $cm^3/g$ |
| Modal pore diameter | 29 Angstroms |
| BET surface area | 169 $m^2/g$ |
| % porosity | 22 |
| % micropores | 24 |

When Example 8 was modified only by changing the final temperature of the heating regime, products with the following properties were obtained:

| Example No: | 11 | 8 | 12 | 13 |
|---|---|---|---|---|
| Temperature (° C.) | 200 | 400 | 600 | 900 |
| % silica/alumina | | 90/10 | | |
| Pore volume ($cm^3/g$) | 0.21 | 0.26 | 0.15 | 0.01 |
| Modal pore diameter (Angstroms) | 13 | 15 | 15 | 34 |
| BET surface area ($m^2/g$) | 448 | 381 | 297 | 3 |
| % porosity | 29 | 35 | 53 | 2 |
| % micropores | 63 | 61 | 68 | 0 |

These examples demonstrate the benefit of a calcining temperature within the range of 200° C. to 600° C.

EXAMPLES 14 AND 15

A sol was prepared as follows. 100 ml of TEOS were mixed under continuous stirring at ambient temperature, with the same volume of ethanol. In a second vessel, 18.6 g of aluminium nitrate nonahydrate were dissolved in 80.4 ml of distilled deionised water containing an appropriate volume of concentrated nitric acid to produce an aqueous solution with a pH of 1±0.2. To produce the sol, the aqueous solution was added to the ethanolic solution under continuous stirring at ambient temperature. In this way, a sol containing 1 volume of alcohol per volume of TEOS was made.

To prepare the refractory oxide, 100 ml of the above sol was heated under the following regime: 10° C./hr to 95° C., hold for 3 hours, followed by 10° C./hr to 400° C., hold for 12 hrs.

The properties of the final product were examined and found to be as follows (Example 14):

| % silica/alumina | 90/10 |
|---|---|
| Pore volume | 0.26 cm$^3$/g |
| Modal pore diameter | 15 Angstroms |
| BET surface area | 381 m$^2$/g |
| % porosity | 35 |
| % micropores | 61 |

When ammonia was used instead of nitric acid in Example 14 such as to produce an aqueous solution with a pH of 10, the properties of the product were found to be as follows (Example 15):

| % silica/alumina | 90/10 |
|---|---|
| Pore volume | 0.39 cm$^3$/g |
| Modal pore diameter | 15 Angstroms |
| BET surface area | 154 m$^2$/g |
| % porosity | 42 |
| % micropores | 11 |

When the amount of aluminium nitrate was increased from 18.6 g to 72.9 g, the properties of the sol and of the final product were found to be as follows (see Example 10 above):

| Sol | |
|---|---|
| pH | 0.9 |
| Viscosity | 16.3 mPas |
| Gelation time | 8 days |
| Product | |
| % silica/alumina | 70/30 |
| Pore volume | 0.13 cm$^3$/g |
| Modal pore diameter | 29 Angstroms |
| BET surface area | 169 m$^2$/g |
| % porosity | 22 |
| % micropores | 24 |

EXAMPLES 16 TO 21

Membrane Preparation

A bilayer substrate, marketed under the name P8/V1 BICERAMIC, from Fairey Industrial Ceramics, was used. This substrate comprises mullite having a pore size of 35 μm carrying an alumina wash coat of 1 to 3 μm pore size. The substrate is first contacted with an ethanol solvent. The surface of the substrate is then contacted with an appropriate sol, such as those described in the preceding examples. Contact is maintained for 5 seconds. Immediately, the membrane and the substrate are placed in an oven and heated according to the following regime: 10° C./hr to 95° C., hold for 3 hours, 10° C./hr to a temperature of 400° C., hold for 12 hours, 10° C./hr cooling to ambient temperature. This dip coating procedure is repeated for 15 cycles to build up the membrane layer.

After deposition of the membrane, in the case of some examples, the surface is treated with TEOS at the level of 50 ml orthosilicate per gram of micropoprous silica-alumina oxide, for 2 hours to further decrease the pore diameter of the membrane material. This material is then heated according to the following heating regime: 10° C./hr to 95° C., hold for 3 hours, 10° C./hr to a temperature of 400° C., hold for 12 hours, 10° C./hr cooling to ambient temperature. Using this method, a number of membranes were prepared.

Tubular membranes having a membrane surface area of 46 cm$^2$ were prepared as described above and used for the separation of gas mixtures, specifically mixtures of carbon dioxide in natural as. The following operating conditions were used:

Feed pressure: 1.68 to 5.8 bar absolute
Permeate pressure: ambient
Feed flows: 1000 to 5000 l/hr
Temperature: ambient The results were as follows:

| Example No. | TEOS | | % CO$_2$ | |
|---|---|---|---|---|
| | Membrane | Treatment | Feed | Permeate | Enrichment |
| 16 | Ex. 7 | No | 40 | 44 | 1.06 |
| 17 | Ex. 7 | No | 20 | 21 | 1.05 |
| 18 | Ex. 4 | No | 50 | 52 | 1.04 |
| 19 | Ex. 7 | Yes | 52 | 60 | 1.16 |
| 20 | Ex. 7 | Yes | 45 | 56 | 1.25 |
| 21 | Ex. 7 | Yes | 31 | 37 | 1.21 |

We claim:

1. A fluid separation membrane comprising a calcined product carried on a porous support, wherein said calcined product is prepared by a process comprising:

(i) forming a solution of tetraethyl orthosilicate in a non-aqueous solvent selected from monohydric alcohols having from 1 to 4 carbon atoms and mixtures thereof, the volume ratio of said tetraethyl orthosilicate to said non-aqueous solvent being from 1:1 to 1:5.

(ii) forming an aqueous solution of aluminum nitrate;

(iii) hydrolyzing said solution of tetraethyl orthosilicate by adding thereto said aqueous solution of aluminum nitrate, thereby to form a sol having a viscosity of from 1 to 10 mPas, and (iv) calcining said sol at a temperature of from 200° C. to 600° C. to form a calcined product having a modal pore diameter of about 3 to 20 Å and a porosity of between 10 and 70%.

said aqueous solution of aluminum nitrate and said solution of tetraethyl orthosilicate being used in such concentrations and relative proportions that said calcined product contains at least 80% by weight silica, calculated as SiO$_2$.

2. The fluid separation membrane of claim 1, wherein the concentration and relative proportions of the solutions are so chosen that the sol contains less than 15 moles water per mole of tetraethyl orthosilicate.

3. The fluid separation membrane of claim 1, wherein said porous support is selected from the group consisting of alumina, silica and aluminosilicates.

4. The fluid separation membrane of claim 1, wherein said porous support is selected from the group consisting of alumina and mullite.

5. The fluid separation membrane of claim 1, wherein said porous support has a pore size of from 0.1 to 5 μm.

6. The fluid separation membrane of claim 1, wherein said porous support has a pore size of from 0.3 to 3 μm.

7. A process for the separation of fluids, comprising bringing a mixture of fluids into contact with the fluid separation membrane of claim 1, and separating said fluids.

8. A process for the separation of fluids, comprising bringing a mixture of fluids into contact with the fluid separation membrane of claim 2, and separating said fluids.

9. A process for the separation of fluids, comprising bringing a mixture of fluids into contact with the fluid separation membrane of claim 3, and separating said fluids.

10. A process for the separation of fluids, comprising bringing a mixture of fluids into contact with the fluid separation membrane of claim 4, and separating said fluids.

11. A process for the separation of fluids, comprising bringing a mixture of fluids into contact with the fluid separation membrane of claim 5, and separating said fluids.

12. A process for the separation of fluids, comprising bringing a mixture of fluids into contact with the fluid separation membrane of claim 6, and separating said fluids.

\* \* \* \* \*